United States Patent [19]
Sarma et al.

[11] Patent Number: 5,980,606
[45] Date of Patent: Nov. 9, 1999

[54] METHOD FOR REDUCING SULFURIC CONTENT IN THE OFFGAS OF AN IRON SMELTING PROCESS

[75] Inventors: Balu Sarma, Airmont, N.Y.; Kenneth B. Downing, Greenville, S.C.; Joseph E. McGreal, Pittsburgh, Pa.

[73] Assignee: Steel Technology Corporation, Washington, D.C.

[21] Appl. No.: 08/828,268

[22] Filed: Mar. 21, 1997

Related U.S. Application Data

[60] Provisional application No. 60/013,887, Mar. 22, 1996.

[51] Int. Cl.⁶ .................................................... C21B 11/00
[52] U.S. Cl. .............................................. 75/502; 75/961
[58] Field of Search ............................ 75/492, 500, 501, 75/502, 961

[56] References Cited

U.S. PATENT DOCUMENTS

| | | | |
|---|---|---|---|
| 4,756,748 | 7/1988 | Lu et al. ....................................... | 75/38 |
| 4,852,995 | 8/1989 | Cordier et al. .......................... | 423/230 |
| 5,279,643 | 1/1994 | Kaneko et al. ............................ | 75/499 |
| 5,282,881 | 2/1994 | Baldock et al. .......................... | 75/500 |
| 5,338,336 | 8/1994 | Greenwalt .................................. | 75/445 |
| 5,366,537 | 11/1994 | Schlichting ................................ | 75/528 |
| 5,374,297 | 12/1994 | Schlichting ................................ | 75/528 |
| 5,378,260 | 1/1995 | Cox et al. .................................... | 75/500 |
| 5,397,376 | 3/1995 | Greenwalt .................................. | 75/445 |
| 5,470,375 | 11/1995 | Greenwalt .................................. | 75/505 |
| 5,538,703 | 7/1996 | Flytzani-Stephanopoulos ........ | 423/230 |
| 5,630,862 | 5/1997 | Greenwalt .................................. | 75/492 |

FOREIGN PATENT DOCUMENTS

| | | |
|---|---|---|
| 0007856 | 2/1980 | European Pat. Off. . |
| 686703A1 | 12/1995 | European Pat. Off. . |
| 690136A1 | 1/1996 | European Pat. Off. . |
| 726326A2 | 8/1996 | European Pat. Off. . |
| 735146A1 | 10/1996 | European Pat. Off. . |
| 59-153848 | 9/1984 | Japan . |
| 789619 | 12/1980 | U.S.S.R. . |

OTHER PUBLICATIONS

E. Aukrust, "AISI Direct Steelmaking Program, Annual Technical Report for the Year Ending Nov. 30, 1991," U.S. Department of Energy Publication (ID 12847), (Jan. 1992).
E. Aukrust, "AISI Direct Steelmaking Program, Annual Technical Report for the Year Ending Nov. 30, 1992," U.S. Department of Energy Publication (ID 12847), (Jan. 1993).
E. Aukrust, "AISI Direct Steelmaking Program, Annual Technical Report for the Year Ending Nov. 30, 1993," U.S. Department of Energy Publication (ID 12847), (Feb. 1994).
E. Aukhurst, "AISI Direct Steelmaking Program, Final Technical Report" U.S Department of Energy Publication (ID 12847), (Aug. 1994).
"Recent Practical Achievements on the AISI Direct Smelting of Steel Plant Waste Oxide", William Dennis, American Iron and Steel Institute Gorham Conference in Atlanta, Mar. 22, 1995.
"Investigation on the Effect of Zn on the Behavior of S in the Iron Bath Smelting Reduction Process", Hong–jia Li and Masanni Tokuda, Steel Research 64 (1993) No. 1, p. 39.

*Primary Examiner*—Melvyn Andrews
*Attorney, Agent, or Firm*—Fitzpatrick, Cella, Harper & Scinto

[57] ABSTRACT

In order to lower the sulfuric content of the offgas from a smelter reactor in which iron oxide is reduced to molten iron, in the presence of sulfur contaminants, a sufficient amount of a source of zinc is included in the charge to the reactor that the combined weight of the zinc source and the iron oxide source contains at least about 0.6% Zn (calculated as elemental zinc), on a dry weight basis. The temperature of the offgas is maintained at or above approximately 700° C. Vaporized zinc, present in the offgas, binds with sulfur in the offgas to precipitate solid ZnS. After removal of the ZnS, the offgas may have a sulfuric content below 50 ppm by volume of $H_2S$ equivalent. Suitable sources of zinc include blast furnace dust, electric arc dust, basic oxygen furnace dust, zinc calcine, and zinc sinter.

19 Claims, 10 Drawing Sheets

METHOD FOR REDUCING SULFURIC CONTENT IN THE OFFGAS OF AN IRON SMELTING PROCESS

This application claims the benefit of U.S. Provisional Application No. 60/013,887, filed Mar. 22, 1996.

BACKGROUND OF THE INVENTION

The present invention relates generally to the smelting of iron oxides by processes that generate an offgas effluent that has a sulfuric content. More particularly, the invention concerns a method of reducing the sulfuric content in such an offgas. The method has particular utility in smelting processes using iron ores and iron-bearing oxides such as steel plant dusts and sludge. The Government of the United States of America has rights in this invention, pursuant to Cooperative Agreement No. DE-FC07-94ID13284, awarded by the U.S. Department of Energy.

Methods of smelting iron using iron ore pellets and coal-based fuels are well known in the art. During the smelting process, however, a substantial amount of sulfur is released in the offgas effluent. The sulfur present within the offgas originates from the sulfur contained in the iron oxide and coal charged to the smelter reactor. The sulfur usually is present in the iron oxide or coal in one or more of the following chemical forms: calcium sulfide, calcium sulfate, manganese sulfide, manganese sulfate, iron sulfide, iron sulfate, and organic compounds containing sulfur. In the offgas the sulfur typically is present in one or more of the following chemical forms: hydrogen sulfide, carbon oxysulfide, sulfur dioxide, and carbon disulfide. Traditionally, the sulfuric level in the offgas has been reduced by incorporating conventional gas desulfurization equipment into the process. However, current gas desulfurization equipment involves the use of lime (CaO), or redox equilibria, which require expensive equipment. Moreover, the desulfurization equipment has high operating costs.

Generally, the high sulfur levels present in steel plant effluent must be lowered prior to reaching the environment. However, the use of conventional equipment to reduce sulfur levels deleteriously affects iron smelting process costs. Accordingly, it is an object of the invention to produce an economical method of iron smelting that minimizes the environmental impact.

SUMMARY OF THE INVENTION

The present invention relates to a method of reducing the sulfuric content in the offgas of an iron smelting process. The iron smelting process includes a plurality of steps. A source of iron oxide and a carbonaceous fuel (with one or both containing some sulfur) are charged to a smelter reactor. Conditions are maintained in the reactor to cause at least some of the iron oxide to be chemically reduced by endothermic reaction with the carbon. Oxygen is continuously blown into the smelter reactor to support combustion that releases heat to support the reduction of the iron oxide. A bath of molten iron is thus created in the bottom of the smelter reactor, surmounted by a layer of slag. The present invention relates to such a process in which an offgas having a sulfuric content is released from the smelter reactor.

According to the present invention, at least some of the sulfuric content of the offgas from the reactor is removed by a combination of steps. First, a sufficient amount of zinc source is included in the charge to the smelter reactor that the combined weight of the zinc source and the iron oxide source contains at least 0.6% Zn (calculated as elemental zinc), on a dry weight basis. The zinc can exist in either compound or elemental form. Because of its presence in the charge, zinc is contained in the offgas effluent. Second, the zinc-containing offgas is kept at a temperature at or above approximately 700° C. Third, at least some of the sulfur in the offgas is then precipitated in the form of solid ZnS. Preferably a combination of zinc content, offgas temperature, and degree of ZnS precipitation is chosen that results in an effluent sulfuric content (after the ZnS precipitation) that is below 50 ppm by volume of $H_2S$ equivalent ($ppm_v$). This level can be as much as ten times lower than the sulfuric content that would be present if the present improvement were not utilized. The de-sulfurized offgas can then be used directly in the smelting plant for a variety of purposes, as, for example, generating steam in slab reheating furnaces, or partially replacing purchased natural gas. The method of the present invention is most useful if the amount of sulfur in the feed to the smelter (calculated as elemental sulfur) is at least about 0.1%, based on the combined dry weight of the source of iron oxide and the carbonaceous fuel. Often the sulfur level will be 0.4% or more.

DETAILED DESCRIPTION OF THE PREFERRED EMBODIMENTS

Figure 1:
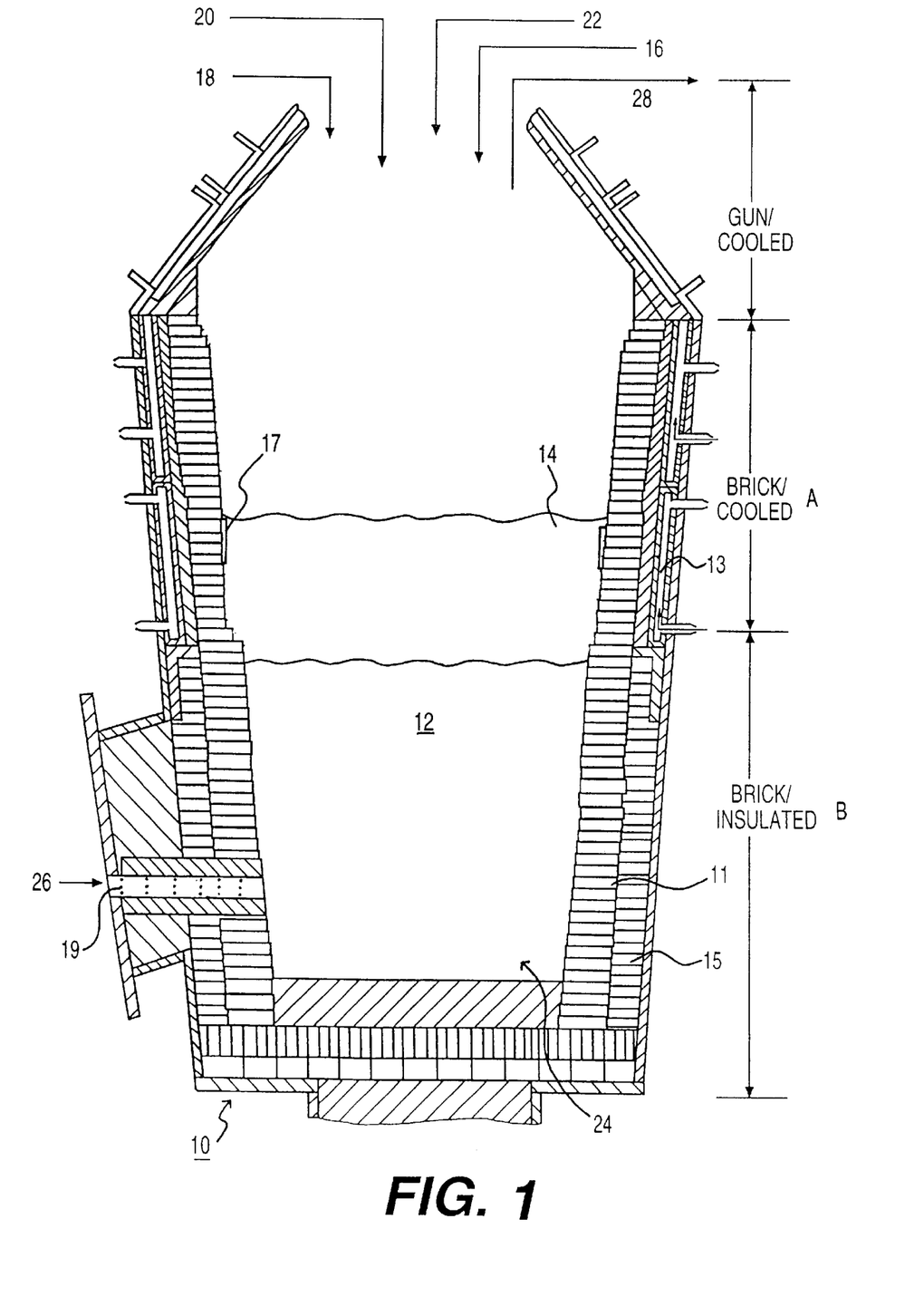
FIG. 1 is a schematic drawing of a smelter reactor showing gun-cooled, brick-cooled, and brick-insulated sections.

FIG. 1 illustrates a smelter reactor 10 with brick-cooled section A and a brick-insulated section B in which the process of the invention can occur. The smelter reactor 10 can be any of a number of types of reaction vessels commonly known to those skilled in the art and used for the smelting of metals and their ores. In the embodiment depicted in FIG. 1, a source of iron oxide 16, such as iron ore, is being reduced to iron, and the resulting iron is being refined.

As shown schematically in FIG. 1, a bath of molten iron 12 in the smelter reactor 10 is being refined and iron ore is being reduced. A molten (foaming) slag layer 14 rests on top of the bath of molten iron 12. During operation, a mixture of iron oxide 16 and a source of zinc are charged to the smelter reactor 10.

Numerous different mixtures of iron oxide 16 and waste oxides 18 can be charged to the reactor 10. Preferably, the sources of waste oxides 18 can be any of a number of materials, including, but not limited to, blast furnace dust, blast furnace sludge, electric arc furnace dust, electric arc furnace sludge, basic oxygen furnace dust, basic oxygen furnace sludge, zinc calcine, and zinc sinter. One method of introducing waste oxides 18 is by mixing iron oxide 16 in pellet form with agglomerated briquettes of waste oxides 18. The agglomerated briquettes of waste oxides 18 are preferably formed by combining blast furnace (BF) dust/sludge, basic oxygen furnace (BOF) dust/sludge, or rolling mill (RM) sludge with a binder comprising molasses and cement. The blast furnace dust/sludge, basic oxygen furnace dust/sludge, and rolling mill sludge can be obtained from the operation of integrated steel producers. Typically, the mixture of waste oxides 18 produced by integrated steel producers generally has a Zn content of up to about 3.5% (calculated as elemental zinc) on a dry weight basis. While waste oxides 18 can be charged in the form of agglomerated briquettes, the blast furnace dust or basic oxygen furnace dust can also be pneumatically injected into the slag 14. Preferably, the waste oxides 18 are directly injected into the reactor 10 in this manner.

The smelter reactor 10 is also charged with a carbonaceous fuel 20. Preferably, the carbonaceous fuel 20 consists of either coal or coke breeze. In addition, oxygen 22 is blown into the smelter reactor 10. Both the carbonaceous fuel 20 and oxygen 22 can be top blown via a central, water-cooled, dual circuit lance (not shown) into the slag 14 contained within the smelter reactor 10. U.S. Pat. No. 5,374,297, incorporated herein by reference, discloses a structure of an overhead lance for injecting both oxygen 22 and a carbonaceous fuel 20.

During the smelting process, the iron oxides 16 dissolve in the liquid slag 14 and are reduced by carbon to produce molten iron 12. The gangue oxides present in the charge report to the liquid slag 14. The carbon within the carbonaceous fuel 20 charged to the smelter reactor 10 acts as both a fuel and a reductant. In addition, any carbon present within the waste oxides 18 charged to the smelter reactor 10 is also used as a fuel/reductant. This advantageously results in a reduction of the fuel requirement. Still referring to FIG. 1, nitrogen 24 is injected through tuyeres (not shown) at the bottom of the smelter reactor 10 in order to stir the bath of molten iron 12. The molten iron 12 and the layer of slag 14 that are produced in the smelter reactor 10 are eventually tapped, whereby some of each layer is removed from the smelter 10.

Preferably, the reactor 10 is tapped at regular intervals through a single taphole 26, using a mudgun and drill system. The removed molten iron 12 is a carbon-saturated hot metal 19 that can be further pigged or granulated. In addition, the molten iron 12 can be used in an electric arc furnace or basic oxygen furnace for further processing. The slag 14 obtained from the smelter reactor 10 can be used in a variety of applications, as, for example, in the construction industry.

The energy requirements of the smelting process are provided by a primary combustion reaction and a post-combustion reaction. The primary combustion reaction is the partial oxidation of the carbon in the melt or carbon in the coal to form carbon monoxide. The produced CO rises from the melt and, in the postcombustion reaction, is further oxidized by the incoming oxygen to form $CO_2$ in an exothermic reaction. Typically, the carbonaceous fuel, e.g., coal or coke breeze, will release some hydrogen gas, which also will combine with the incoming oxygen in an exothermic reaction, generating $H_2O$ that exits the reactor, along with the $CO_2$, in the offgas. These post-combustion reactions provide additional heat for the endothermic reduction of the iron oxide.

During operation of the smelter reactor 10, a dust-laden offgas effluent 28 is produced, which contains a plurality of constituents, including carbon dust and one or more sulfur compounds. Still referring to FIG. 1, sulfur is introduced to the smelter reactor as a contaminant of the carbonaceous fuel source 20 and/or the iron oxide source 16. In addition, sulfur will typically be contained within the waste oxides 18 charged to the reactor 10. During operation, the sulfur gets distributed among the hot metal 19, slag 14, and offgas 28. Within the offgas 28, the sulfur is present primarily in the form of gaseous $H_2S$, COS, $SO_2$, and $CS_2$.

In order to reduce the sulfuric content within the smelter offgas 28, a sufficient quantity of zinc is charged to the smelter reactor 10. A number of experiments with differing sources of waste oxides 18 were conducted, in which numerous parameters affecting the smelting process were measured. Experimentally, it was determined that to reduce the sulfur content in the offgas 28 to a level below 50 $ppm_v$, the combined charge to the reactor 10 of waste oxides 18 and iron oxide 16 should preferably contain at least 0.6% Zn, on a dry weight basis. Even more preferably, however, the charge to the reactor 10 of waste oxides 18 and iron oxide 16 should contain zinc within the range of about 0.6% to about 25%. The desired level of Zn can be obtained, for example, by blending the iron oxide 16 charged to the smelter 10 with blast furnace (BF) dust, basic oxygen furnace (BOF) dust, or electric arc furnace (EAF) dust, all of which typically contain zinc—e.g., in a concentration of up to about 25 wt. % (calculated as elemental zinc).

Figure 2:
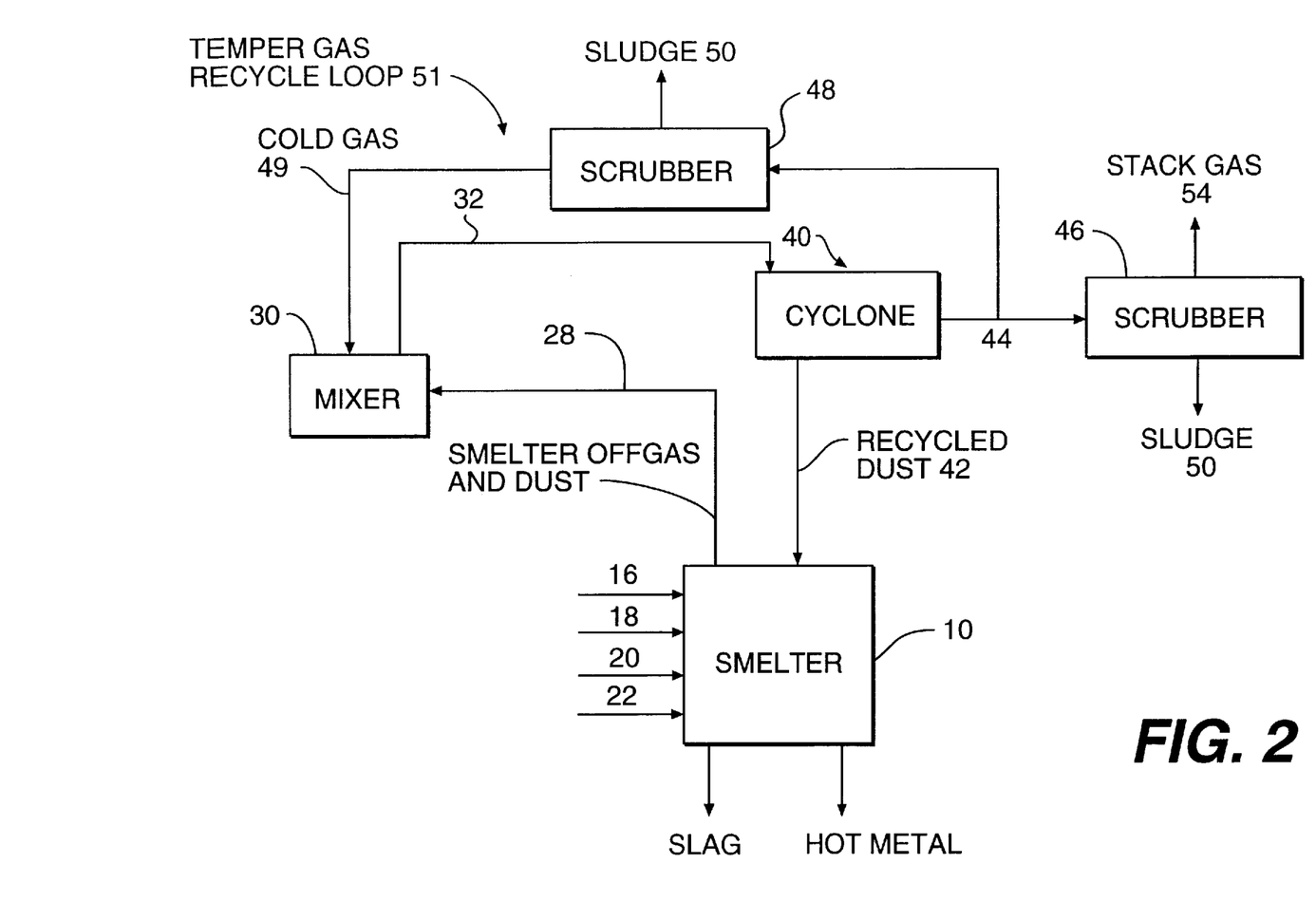
FIG. 2 is a flowsheet of a pilot plant used to reduce the sulfuric content in the offgas from a smelter reactor according to one embodiment of the invention.

FIG. 2 illustrates a flowsheet for a plant utilizing the present invention to reduce the sulfuric content in offgas 28. Referring now to FIGS. 1 and 2, the dust-laden offgas 28 exits the smelter reactor 10 at a temperature above 1000° C. The offgas 28 exiting the smelter reactor 10 is mixed with a cold gas stream 49 from temper gas recycle loop 51 within mixer 30. The temper gas recycle loop 51 aids in adjusting the flowrate and temperature of offgas 28. The combined offgas streams 32 then pass to a cyclone 40. It should be noted that, in the present invention, the presence of cyclone 40 and temper gas loop 51 are optional, i.e., the sulfuric content of offgas 28 can be reduced without the presence of cyclone 40 and the temper gas loop 51. Nonetheless, it may be advantageous to incorporate cyclone 40 in order to reduce the amount of ferrous and carbonaceous solids in the offgas. Preferably, the offgas stream 32 entering cyclone 40 will have a temperature of at least about 700° C., e.g. at or above about 800° C., or even at or above about 900° C. Within cyclone 40, carbonaceous and ferrous solids, which may comprise a significant portion of the dust in offgas 28, are removed from the gas. Preferably, as seen in FIG. 2, a cyclone 40 capable of operation at temperatures up to as high as 1000° C. separates both the carbonaceous and ferrous solids from the offgas 28.

Referring to FIGS. 1 and 2, a description of the Zn path will now be described. While the reactor 10 is charged with both the iron oxide 16 and waste oxide feed 18, the zinc compounds present in both feeds are reduced and volatilized, producing gaseous Zn. The gaseous Zn then exits the smelter reactor 10 in the offgas 28. The Zn next passes through the hot cyclone 40 with minimal loss of Zn to the cyclone catch 42 when the cyclone temperature is maintained above 900° C.

Still referring to FIG. 2, the offgas 28 exits cyclone 40 and is split into two separate streams that are fed to a pair of scrubbers 46 and 48. Most or all of any dust that bypasses the hot cyclone 40 is collected at either one of the two scrubber systems 46 and 48. In addition, the wet scrubbers 46 and 48 advantageously wash the offgas 44 exiting cyclone 40 with water to extract gaseous components of offgas 44. The wet scrubbers 46 and 48 typically precipitate a sludge 50 containing ZnO and ZnS.

Other methods of precipitating ZnS can be used besides washing the offgas with water. For example, ZnS can be precipitated by electrostatic precipitation, or by the use of a baghouse filter.

Numerous smelting operations were conducted in the pilot plant illustrated in FIG. 2 to determine the effects of various operating parameters. Both coal and coke breeze were used as a source of carbonaceous fuel source 20. In addition, various sources of waste oxides 18 were blended with a source of iron oxide 16, in varying ratios prior to charging the reactor 10. The experimental results of the trials will now be described.

The smelter reactor 10 shown in FIG. 1 is illustrative of the type of smelter reactor 10 used in the pilot plant experiments and includes a brick-cooled section A and a brick-insulated section B. The smelter reactor 10 contains a water-cooled cone and hood (not shown) at the top and is coated with gunnite material. The reactor 10 is lined with refractory 11 up to the cone. The refractory 11 in the metal-free space (upper barrel) is backed by water-cooled copper staves 13. Additional staves 13 may be added to extend the brick-cooled region A into the slag zone (mid barrel). Below the brick-cooled region A, the refractory bricks are backed by an insulating safety lining 15.

In the smelter reactor 10, a taphole 26 was located at approximately the fifteen metric ton (mt) metal line. Casting was conducted approximately every 90 to 120 minutes. Metal 19 and slag 14 samples were taken at cast by the use of a sub-lance (not shown). The offgas 28 exiting the smelter reactor 10 was analyzed by two Perkin-Elmer mass spectrometers. The gas samples were obtained from a duct prior to entry into the cyclone 40, as well as from locations just 10 after the cyclone 40. The offgas 28 was continuously monitored for CO, $CO_2$, $H_2$, $H_2O$, $N_2$, and Ar. A gas chromatography unit was used to measure the levels of sulfur-bearing gases such as $H_2S$, COS, $SO_2$, and $CS_2$.

As recited previously, the offgas 28 exiting the smelter 10 was dust-laden. The nitrogen 24 and oxygen 22 blown into reactor 10 assisted in the creation of the dust-laden offgas 28. As can be seen in FIG. 2, prior to cyclone 40, smelter offgas 28 was tempered by a controlled amount of cold recycle gas 49. The mixed offgas stream 32 then passed to cyclone 40. As the tempered offgas 32 passed through the cyclone 40, some of the dust, which was primarily carbonaceous and ferrous, was removed as cyclone catch, or dust, 42.

With respect to the ferrous content leaving the smelter reactor 10, co-pending U.S. patent application Ser. No. 08/823,012 entitled "Method for Reducing Iron Losses in an Iron Smelting Process" by Sarma et al., filed Mar. 21, 1997, describes a method of reducing the iron level present in the offgas. The disclosure of that application is hereby incorporated herein by reference.

The relatively cleaner gas exiting the cyclone 40 was split into two streams. These streams were quenched separately, by scrubbers 46 and 48, with one stream being used for tempering the gas entering the cyclone 40. The generated sludge 50 from the scrubbers 46 and 48 was sampled regularly. The cleansed offgas 54, exiting the main scrubber 46, was tested for sulfuric content. The cleansed offgas 54 was subsequently burnt in a flare stack.

Various sources of waste oxides 18 were charged to the smelter reactor 10. The steel plant waste oxides 18 smelted in the following examples were BF dust and sludge, BOF dust and sludge, and RM sludge. The composition of the various agglomerated waste oxides 18 used in the pilot plant trials is shown below in Table 1.

TABLE 1

Composition of Agglomerated Waste Oxides (Wt. %)

| Agglomerate | BF Dust | BF Sludge | BOF Dust | BOF Sludge | Rolling Mill Sludge | Zinc Calcine | Zn Level (%) |
|---|---|---|---|---|---|---|---|
| A | 40 | 40 | 20 | 0 | 0 | 0 | 0.67 |
| B | 40 | 20 | 20 | 0 | 20 | 0 | 0.70 |
| C | 22.5 | 22.5 | 20 | 35 | 0 | 0 | 0.81 |
| D1 | 25 | 25 | 50 | 0 | 0 | 0 | 1.27 |
| D2 | 25 | 25 | 50 | 0 | 0 | 0 | 3.48 |
| E1 | 0 | 0 | 70 | 0 | 0 | 30 | 21.09 |
| E2 | 15 | 15 | 30 | 0 | 0 | 40 | 24.56 |

Generally, in integrated steel mills, a mixture of the generated BF/BOF/RM waste oxides 18 has a zinc content of up to approximately 3.5% Zn, on a dry weight basis. This was the case with agglomerates A, B, C, D1, and D2, as shown above in Table 1. In electric arc furnace (EAF) based steel plants, the zinc content in the waste can be as much as 25%. In agglomerates E1 and E2 the zinc level of an EAF plant waste was simulated by using zinc calcine. In some trials, dry BF and BOF dust were directly injected into the slag 14. The chemical composition of the agglomerates smelted is shown below in Table 2.

TABLE 2

Chemistry of Agglomerated and Injected Waste Oxides (Wt. %)

| | Agglomerate | | | | | | | Injected BF Dust | Injected BOF Dust |
|---|---|---|---|---|---|---|---|---|---|
| | A | B | C | D1 | D2 | E1 | E2 | | |
| $SiO_2$ | 7.82 | 6.41 | 5.5 | 6.77 | 5.56 | 3.5 | 4.17 | 6.69 | 1.88 |
| $Al_2O_3$ | 2.11 | 1.99 | 2.37 | 2.2 | 1.32 | 0.92 | 1.05 | 1.66 | 0.27 |
| CaO | 13.63 | 12.78 | 12.18 | 18.84 | 11.73 | 9.22 | 8.87 | 5.23 | 16.88 |

TABLE 2-continued

Chemistry of Agglomerated and Injected Waste Oxides (Wt. %)

|  | Agglomerate | | | | | | | Injected BF Dust | Injected BOF Dust |
| --- | --- | --- | --- | --- | --- | --- | --- | --- | --- |
|  | A | B | C | D1 | D2 | E1 | E2 | | |
| MgO | 1.25 | 1.47 | 1.35 | 2.4 | 1.74 | 1.39 | 1.4 | 1.44 | 4.61 |
| FeO | 6.18 | 10.49 | 9.42 | 6.92 | 7.27 | 5.16 | 5.04 | 7.63 | 6.33 |
| $Fe_2O_3$ | 49.5 | 46.87 | 50.67 | 44.75 | 55.7 | 50.46 | 39.98 | 45.37 | 58.82 |
| Fe metallic | 1.42 | 0.89 | 1.21 | 1.38 | 1.1 | 0.79 | 0.5 | 1.03 | 1.21 |
| $Na_2O$ | 0.13 | 0.19 | 0.27 | 0.024 | 0.1 | 1.11 | 0.227 | | 0.03 |
| $K_2O$ | 0.53 | 0.58 | 0.46 | 0.13 | 0.23 | 0.33 | 0.281 | | 0.02 |
| ZnO | 0.83 | 0.87 | 1.01 | 1.58 | 4.33 | 26.85 | 30.57 | | 6.56 |
| PbO | 0.079 | 0.062 | 0.11 | 0.029 | 0.023 | 0.036 | 0.029 | | |
| C | 15.87 | 16.19 | 12.57 | 10.31 | 9.61 | 1.79 | 6.93 | 27.3 | 2.63 |
| S | 0.45 | 0.43 | 0.34 | 0.41 | 0.31 | 0.75 | 1.01 | 0.35 | 0.07 |
| Cl | 0.3 | | 0.23 | | 0.14 | 0.2 | 0.2 | | |
| F | 0.25 | | 0.25 | | 0.35 | 0.088 | 0.15 | | |
| Total Fe | 40.88 | 41.85 | 44.01 | 38.09 | 45.74 | 40.13 | 32.41 | 38.72 | 47.31 |
| Total Gangue | 24.81 | 22.65 | 21.40 | 30.21 | 20.35 | 15.03 | 15.49 | 15.02 | 23.64 |

With reference to FIGS. 1 and 2, a typical run will now be described. Initially, a run began with the charging of about 13 mt of hot metal 12, melted overnight in an induction furnace (not shown), into the smelter 10. Thereafter, oxygen 22 was blown into the smelter 10, wherein the smelting operation continued until the trial objectives were met. Smelter operation during a trial typically lasted about 12 hours. The first hour was used for making slag 14, while the next two hours involved the smelting of hematite pellets. By this time, the offgas 28 was sufficiently heated to allow the input of waste oxides 18 containing zinc, lead, alkalis, and halogens, such that their deposition in offgas ducts and cyclone 40 did not occur. When the addition of waste oxides 18 was terminated, smelter operation was continued with hematite pellets, and a "finishing practice" was adopted. The reactor vessel 10 was drained and allowed to cool before inspection.

Stable operation of the smelter 10 was maintained by controlling the raw material addition rate, i.e., the rate of the iron oxide 16 addition and the rate of waste oxide 18 addition. For example, co-pending U.S. patent application Ser. No. 08/821,445, entitled "Method for Stable Operation of a Smelter Reactor," by Sarma et al., filed Mar. 21, 1997, which is incorporated herein by reference, recites a method of operating a smelter reactor in a stable condition. The material addition rates were adjusted using energy and materials balances for control of the temperature of hot metal 19 and the FeO % (dry weight basis) of slag 14. The typical blowing rate of oxygen 22, after the start-up period, was about 5500 $Nm^3/h$. The target temperature of hot metal 19 was in the range of 1475° C. to 1575 C., while the FeO % of slag 14 was controlled to remain below 6%.

The experiments were run in a pilot plant equipped with a pressurized smelting reactor 10 capable of processing up to 14 tonnes per hour of iron-bearing oxide 16 and waste oxide 18. The sulfur-bearing species in the offgas 54 were analyzed by an ABB 3100 Vista gas chromatograph. Sulfur was present in the added coke breeze or coal, as well as in the agglomerated or injected iron-bearing oxides. Zinc was present in the agglomerated oxides and in the injected BOF dust.

Referring to FIGS. 3 through 6, the sulfuric content in the offgas 54 exiting scrubber 46 during the waste oxide recycling trials at the pilot plant is illustrated. The results from the trials are discussed below.

EXAMPLE I

Figure 3A:
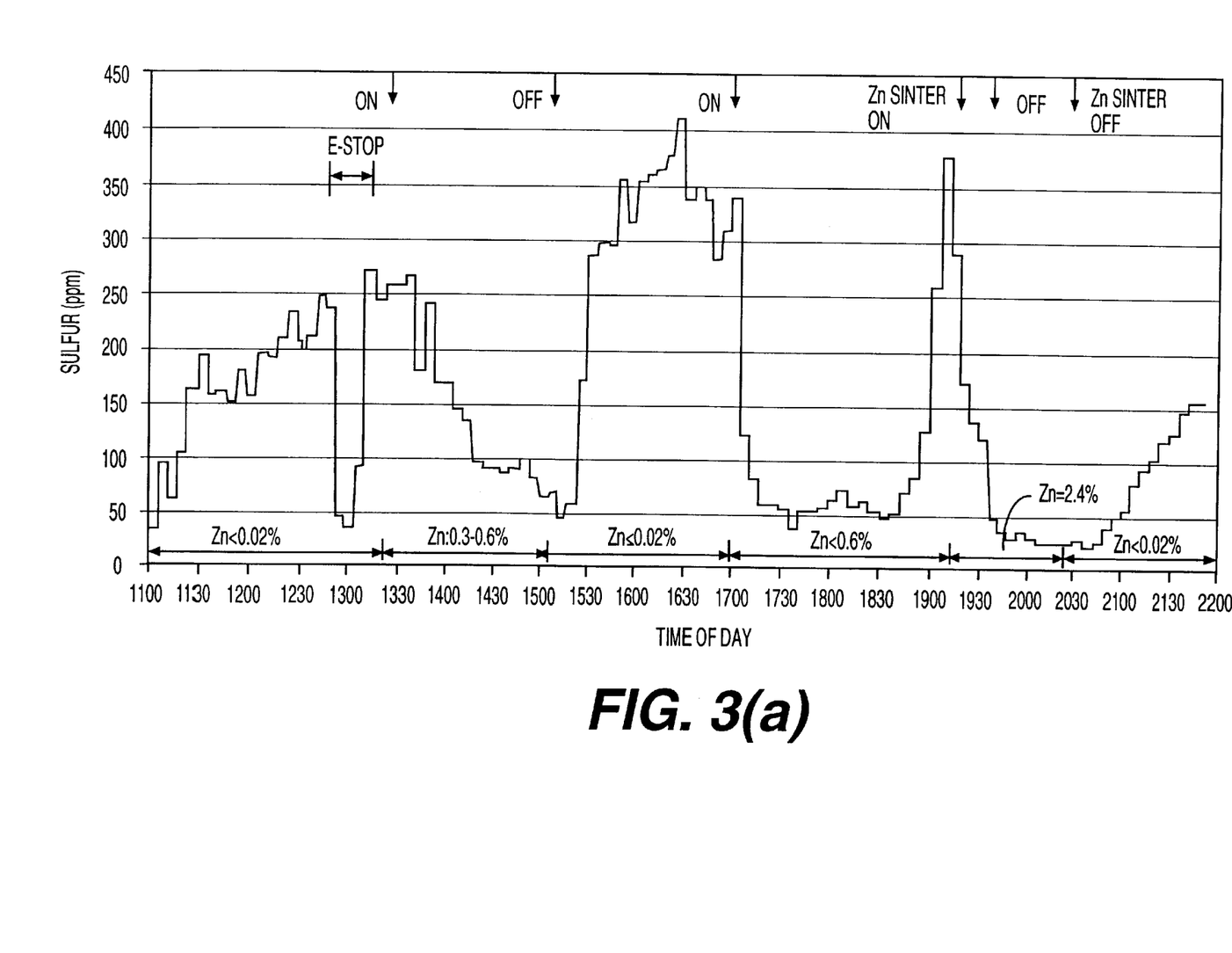
FIG. 3(a) graphically illustrates the total level of sulfur in the offgas in a smelting operation using coke breeze, hematite, and agglomerate B.
Figure 3B:
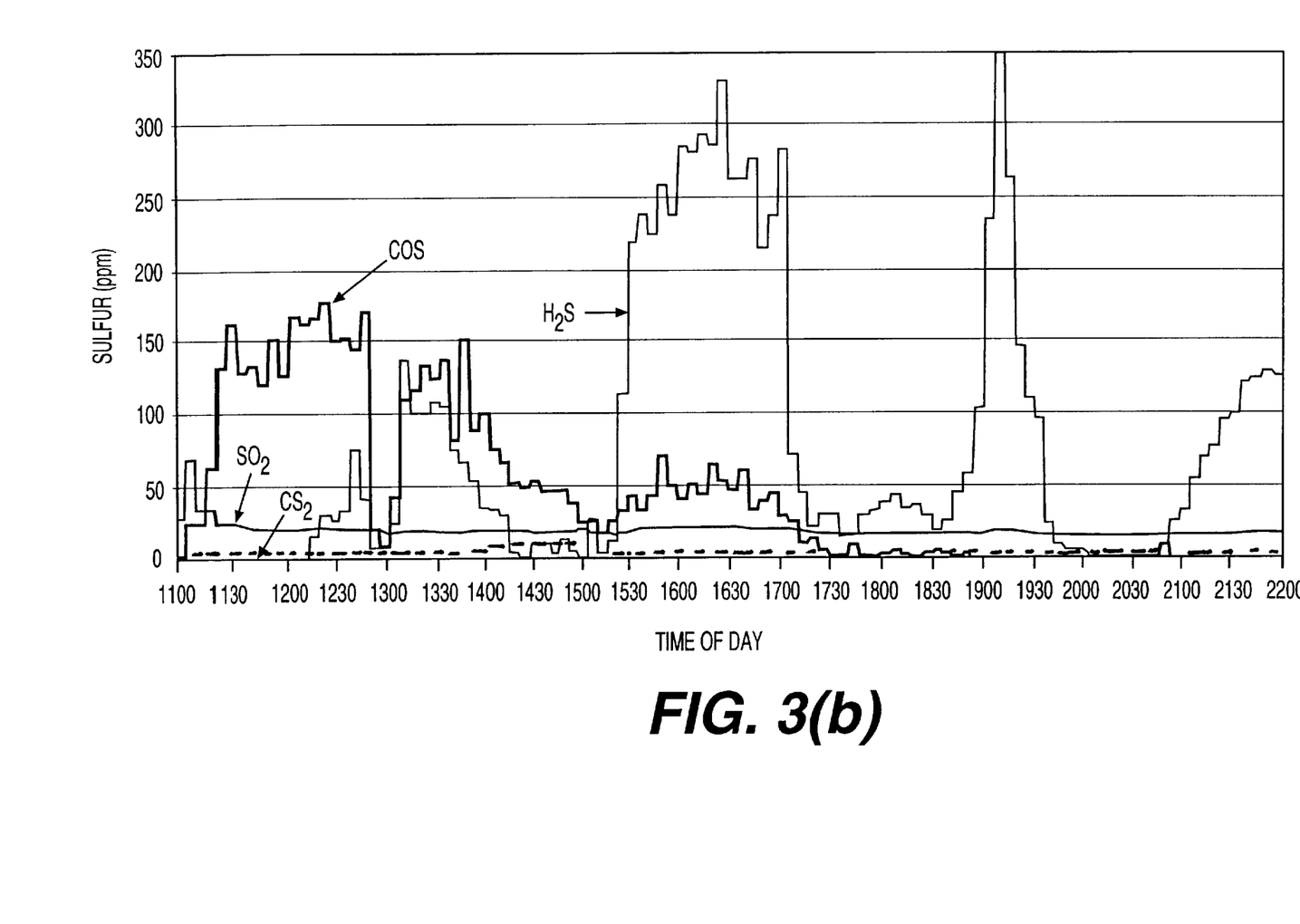
FIG. 3(b) graphically illustrates the individual sulfuric components in the offgas in FIG. 3(a).

Referring to FIGS. 3(a) and 3(b), the raw materials used were coke breeze, hematite pellets, agglomerate B (0.7% Zn), and zinc sinter. FIG. 3(a) depicts the total sulfur (S) in the offgas 54. FIG. 3(b) depicts the individual sulfur species concentrations. Prior to 1300 hours, an E-stop occurred and oxygen blowing and material charging was interrupted for less than 10 minutes. After agglomerate charging began, the sulfuric content in the offgas 54 was reduced, although the sulfuric content stayed above 50 $ppm_v$. The zinc input to the smelter 10 ranged from 0.3 weight percent to 0.6 weight percent of the total iron-bearing feed, on a dry weight basis, during the agglomerate charging period. Between 1520 hours and 1715 hours, agglomerate additions were stopped and zinc was not charged to the smelter 10. The sulfur content of the offgas 54 increased to above 250 $ppm_v$. Agglomerate additions resumed at about 1715 hours and the sulfuric content in the offgas 54 reduced almost instantaneously, to slightly above 50 $ppm_v$. Zinc sinter additions caused the sulfuric content to decrease to below 50 $ppm_v$. The zinc input to the smelter 10 was about 2.4% of the iron-bearing feed during the zinc sinter charging period (dry weight basis). After zinc sinter additions were stopped, the sulfuric content in the offgas 54 increased to above 50 $ppm_v$.

The results from this trial show that the sulfuric content in the offgas 54 decreased to slightly above 50 $ppm_v$ when the zinc input was less than or equal to 0.6 weight percent of the iron-bearing feed on a dry basis. At higher zinc input rates, when operating with zinc sinter, the sulfuric content of the offgas 54 decreased to below 50 $ppm_v$.

EXAMPLE II

Figure 4A:
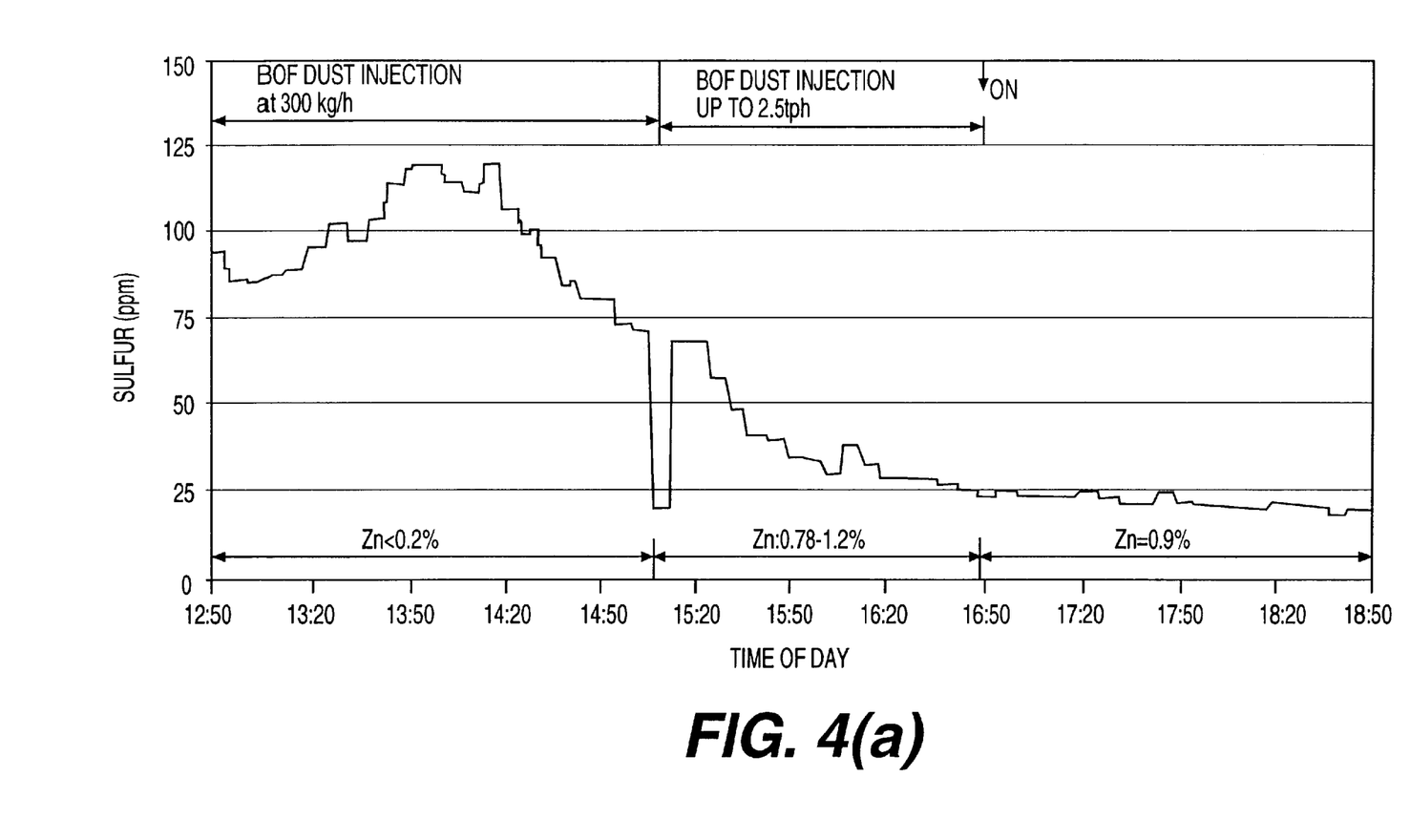
FIG. 4(a) graphically illustrates the total level of sulfur in the offgas in a smelting operation using coke breeze, hematite, agglomerate D1, and injected basic oxygen furnace dust.
Figure 4B:
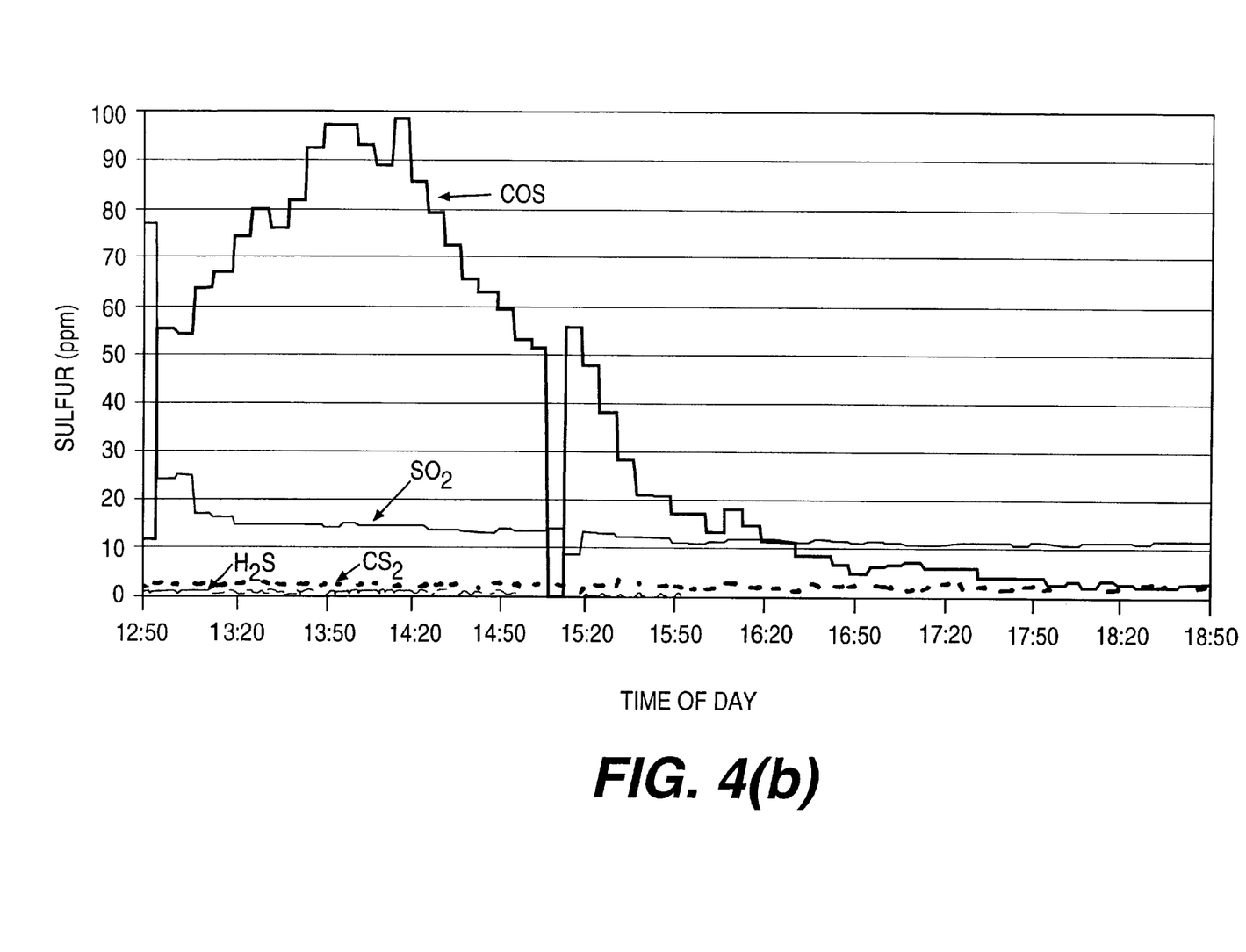
FIG. 4(b) graphically illustrates the individual sulfuric components in the offgas in FIG. 4(a).

Referring now to FIGS. 4(a) and 4(b), a second experiment will now be described. In this experiment, the raw materials used were coke breeze, hematite pellets, injected BOF dust (5.25% Zn) and agglomerate D1 (1.27% Zn). The total sulfuric content in the offgas 54 is depicted in FIG. 4(a). Individual species concentrations are shown in FIG. 4(b). During the initial part of the trial, i.e., before 1500 hours, BOF dust was injected at a low rate. The zinc input to the system was less than 0.2 weight percent of the iron-bearing feed. The total sulfuric content in the offgas 54 was above 50 $ppm_v$. At higher BOF dust injection rates (up to 2.5 tonnes/hour), the sulfuric content decreased to below 50 ppm$_v$. The zinc input at the higher BOF dust injection levels ranged from 0.78 weight percent to 1.2 weight percent of the iron-bearing feed. Agglomerate additions began after BOF dust injection was stopped, and the sulfuric content of the offgas stayed below 50 ppm$_v$. The zinc input during agglomerate charging was about 0.9 weight percent of the iron-bearing feed.

The results from the trial showed that the sulfuric content in the offgas 54 decreased to below 50 ppm$_v$ when the zinc input was greater than or equal to 0.78 weight percent of the iron-bearing feed.

EXAMPLE III

Figure 5A:
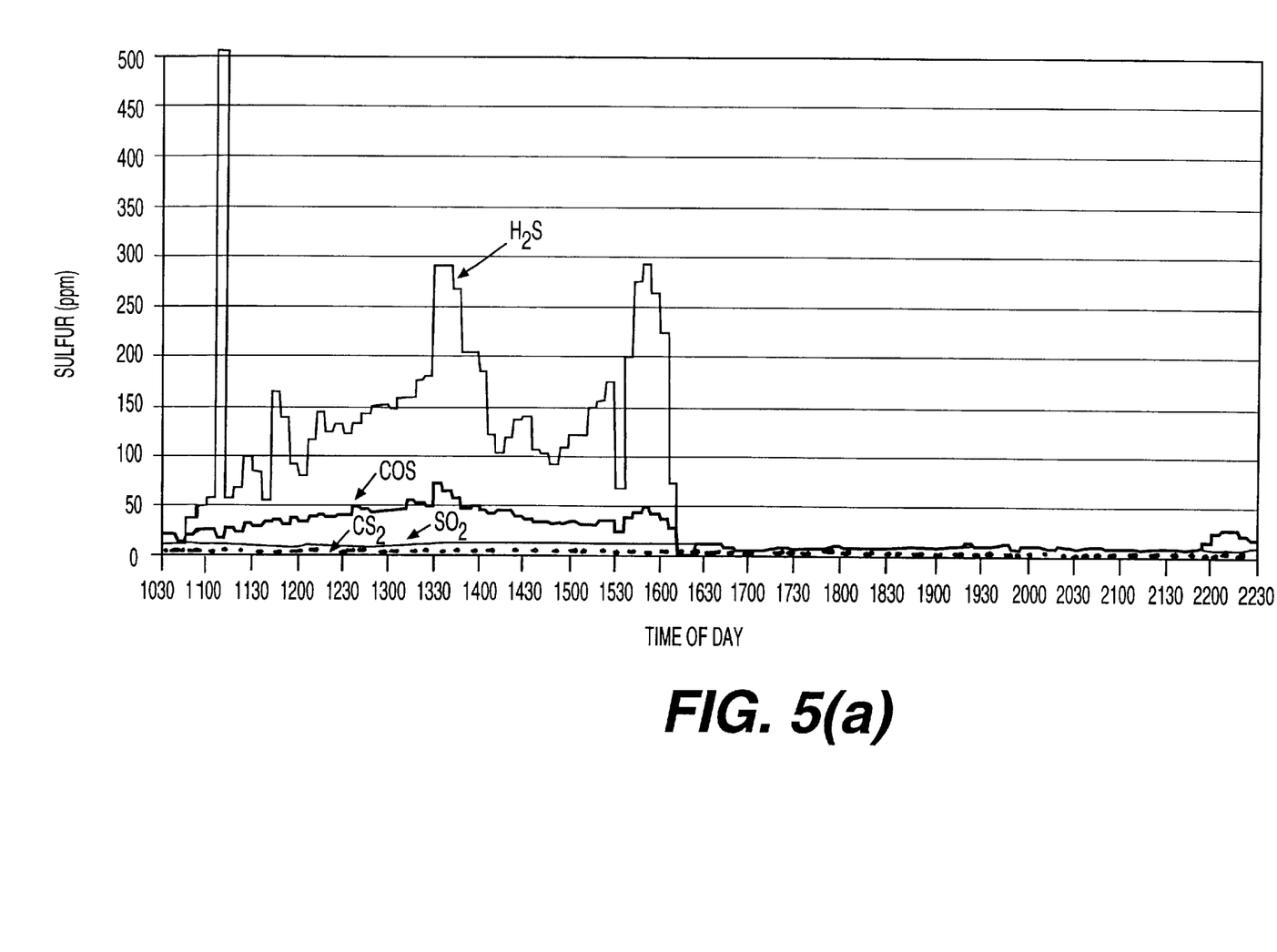
FIG. 5(a) graphically illustrates the total level of sulfur in the offgas in a smelting operation using medium volatile coal, hematite, and agglomerate D2.
Figure 5B:
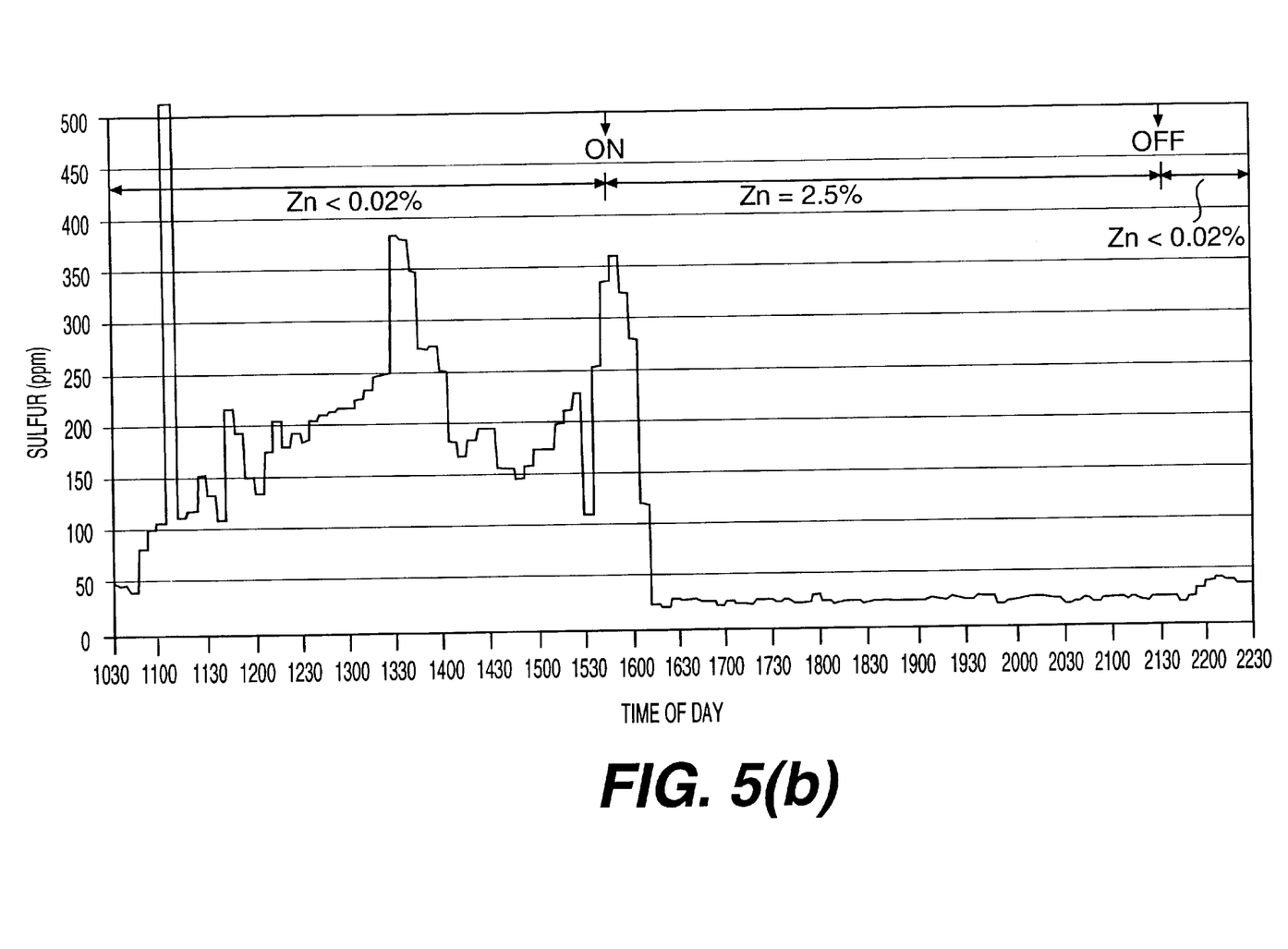
FIG. 5(b) graphically illustrates the individual sulfuric components in the offgas in FIG. 5(a).

Referring to FIGS. 5(*a*) and 5(*b*), a third experiment will now be explained. The raw materials used in this run were medium volatile coal, hematite pellets, injected blast furnace dust and agglomerate D2 (3.48% Zn). The total sulfuric content of offgas stream 54 is illustrated in FIG. 5(*a*). The concentration of individual species is shown in FIG. 5(*b*). Soon after agglomerate additions began, at about 1545 hours, the sulfuric content of offgas 54 decreased to below 50 ppm$_v$. The zinc input to the smelter was about 2.5 weight percent of the iron-bearing feed during operation with agglomerate additions.

EXAMPLE IV

Figure 6A:
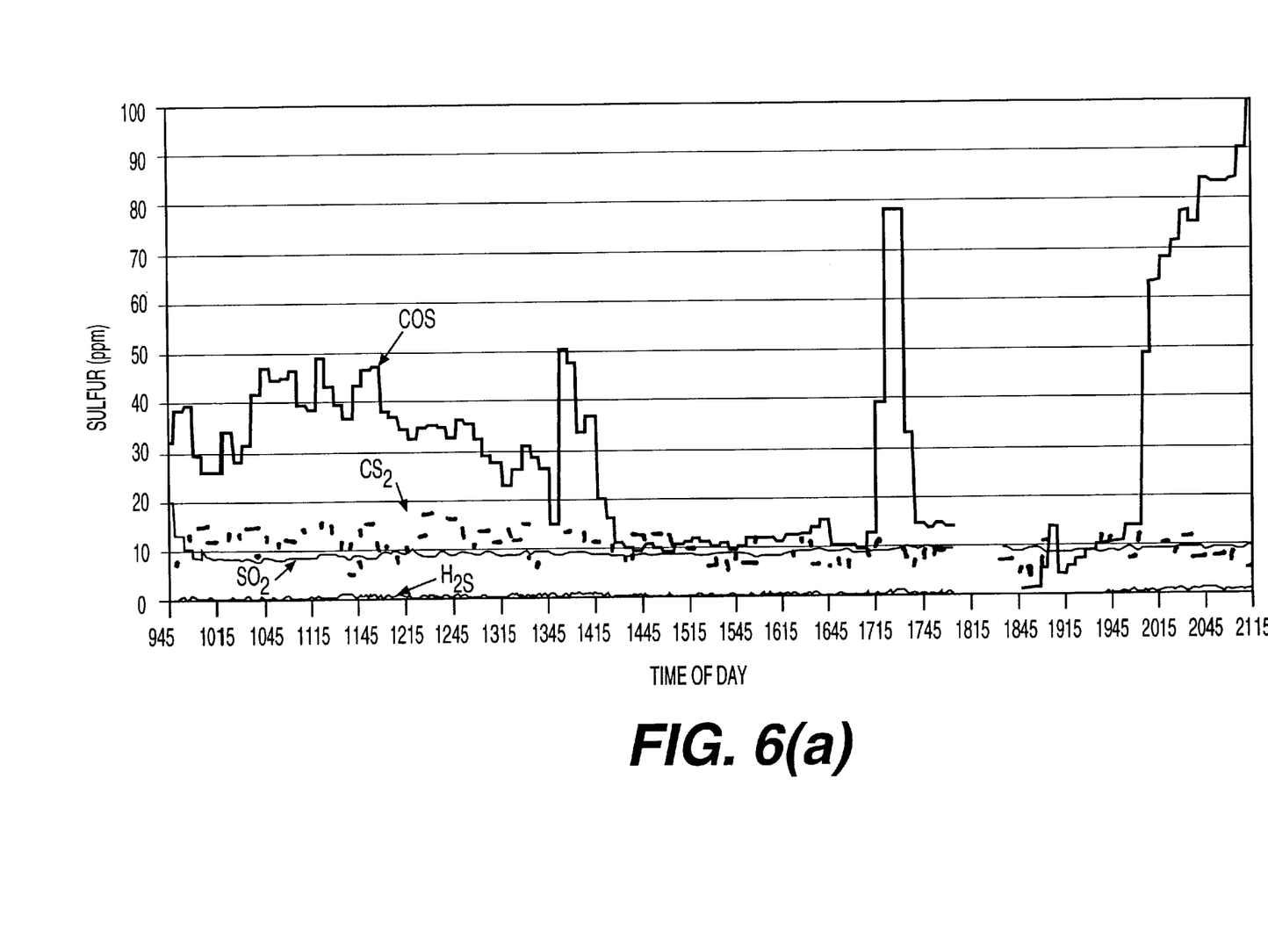
FIG. 6(a) graphically illustrates the total level of sulfur in the offgas in a smelting operation using coke breeze, hematite, and agglomerate E2.
Figure 6B:
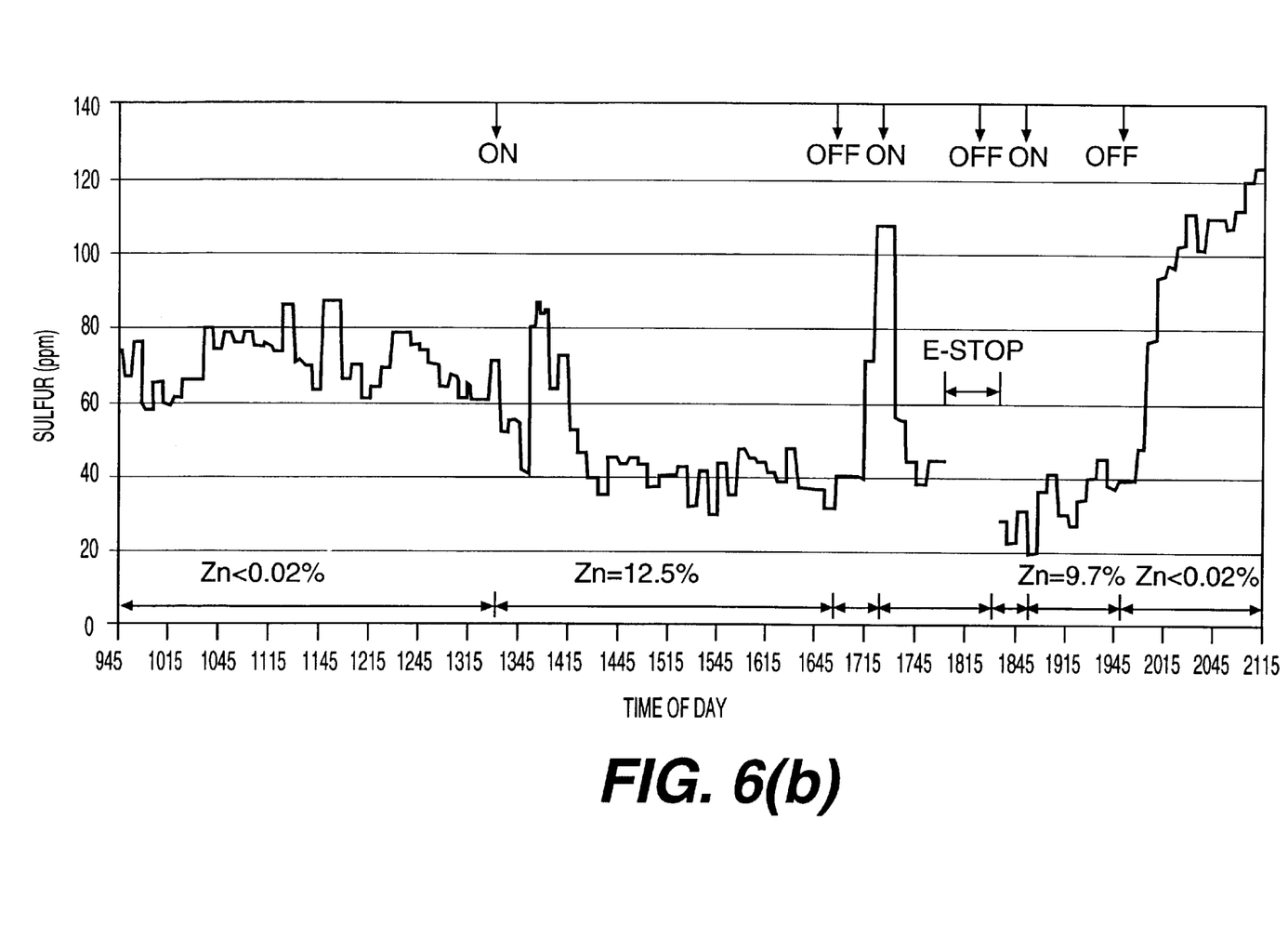
FIG. 6(b) graphically illustrates the individual sulfuric components in the offgas in FIG. 6(a).

Referring to FIGS. 6(*a*) and 6(*b*), a fourth experiment will now be described. The raw materials used were coke breeze, hematite pellets, and agglomerate E2 (24.56% Zn). The total offgas 54 sulfuric content is shown in FIG. 6(*a*). The concentration of individual species is shown in FIG. 6(*b*). The zinc input to the smelter when operating with agglomerates ranged from 9.7 weight percent to 12.5 weight percent of the iron-bearing feed. The offgas sulfuric content decreased to below 50 ppm$_v$. When agglomerate charging was stopped, at about 1700 hours and about 1950 hours, the sulfuric content increased to above 50 ppm$_v$.

In summary, it can be said that the presence of zinc in the charge to the smelter reduces the sulfuric content in the offgas. The sulfuric content in the offgas was slightly above 50 ppm$_v$ when the zinc input was below 0.6 weight percent of the iron-bearing feed. At higher zinc inputs (0.78 weight percent to 12.5 weight percent of the iron-bearing feed), the sulfur content in the offgas decreased to below 50 ppm$_v$.

Chemical analysis of the offgas 54 shows that the equivalent $H_2S$ or $SO_2$ is less than 50 parts per million by volume (ppm$_v$). This is less than 5% of the equivalent $H_2S$ contained in de-sulfurized coke oven gas.

What is claimed is:

1. In a process of smelting iron comprising the steps of:
    a) charging a smelter reactor with a source of iron oxide and a carbonaceous fuel, with a source of sulfur being present in either the iron oxide source or the carbonaceous fuel, or both;
    b) blowing oxygen into said smelter reactor into a layer of foaming slag;
    c) maintaining conditions in said smelter reactor to cause (i) at least some of the iron oxide to be chemically reduced in said layer of foaming slag and (ii) a bath of molten iron to be created in the bottom of the smelter reactor, surmounted by said layer of foaming slag; and
    d) releasing from the smelter reactor an offgas effluent containing a sulfuric content;
    the improvement comprising the following steps:
    e) including a sufficient amount of a source of zinc in the charge to the smelter reactor that the combined weight of the zinc source and the iron oxide source contains at least about 0.6% Zn (calculated as elemental zinc), on a dry weight basis, whereby zinc is present in the offgas as it leaves the reactor;
    f) maintaining the temperature of the zinc-containing offgas effluent at or above approximately 700° C.; and
    g) precipitating at least some of the sulfuric content from said offgas in the form of solid ZnS.

2. The process according to claim 1 wherein the sulfuric content of the offgas, after precipitation of the ZnS, is below 50 ppm by volume of $H_2S$ equivalent.

3. The process according to claim 1, wherein, in step (g), the offgas is washed with water, so as to cause ZnS to precipitate out of the offgas.

4. The process according to claim 1, wherein, in step (g), ZnS is precipitated out of the offgas by electrostatic precipitation.

5. The process according to claim 1, wherein, in step (g), ZnS is precipitated out of the offgas by baghouse filtration.

6. The process according to claim 1, wherein said zinc source charged to said smelter reactor comprises one or more materials selected from the group consisting of blast furnace dust, electric arc furnace dust, basic oxygen furnace dust, zinc calcine, and zinc sinter.

7. The process according to claim 1, wherein said carbonaceous fuel comprises one or more materials selected from the group consisting of coal and coke breeze.

8. The process according to claim 1, wherein said sulfuric content present in the offgas effluent comprises one or more compounds selected from the group consisting of $H_2S$, COS, $CS_2$, and $SO_2$.

9. The process according to claim 1, wherein, in step (e), the combined weight of the zinc source and the iron oxide ranges from 0.6% to about 25% Zn, on a dry weight basis.

10. The process according to claim 1, wherein the sulfuric content in the offgas after precipitating out the ZnS is in the range of about 25 ppm$_v$ to about 50 ppm$_v$.

11. In a process of smelting iron comprising the steps of:
    a) charging a smelter reactor with a source of iron oxide and a carbonaceous fuel comprising one or more members selected from the group consisting of coal and coke breeze, with a source of sulfur being present in either the iron oxide source or the carbonaceous fuel, or both, in an amount providing at least about 0.1% S (calculated as elemental sulfur), based on the combined dry weight of the source of iron oxide and the carbonaceous fuel;
    b) blowing oxygen into said smelter reactor into a layer of foaming slag;
    c) maintaining conditions in said smelter reactor to cause (i) at least some of the iron oxide to be chemically reduced in said layer of foaming slag and (ii) a bath of molten iron to be created in the bottom of the smelter rector, surmounted by said layer of foaming slag; and
    d) releasing from the smelter reactor an offgas effluent containing a sulfuric content, said sulfuric content comprising one or more compounds selected from the group consisting of $H_2S$, $CS_2$, COS, and $SO_2$;
    the improvement comprising the following steps:
    e) including a sufficient amount of a source of zinc in the charge to the smelter reactor that the combined weight of the zinc source and the iron oxide source contains approximately 0.6% to approximately 25% Zn (calculated as elemental zinc), on a dry weight basis, wherein the zinc source comprises one or more materials selected from the group consisting of blast furnace dust, electric arc furnace dust, basic oxygen furnace dust, zinc calcine, and zinc sinter, whereby zinc is present in the offgas released from the reactor;

f) maintaining the temperature of the zinc-containing offgas effluent at or above approximately 700° C.; and g) precipitating ZnS from the offgas by the use of one or more techniques selected from the group consisting of (i) washing the offgas with water, (ii) electrostatic precipitation, and (iii) baghouse filtration, wherein the sulfuric content in the offgas after precipitating out the ZnS is below about 50 $ppm_v$.

12. The process according to claim 11, wherein, in step (f), the temperature of the offgas effluent is maintained at or above approximately 800° C.

13. The process according to claim 11, wherein in step (f), the temperature of the offgas effluent is maintained at or above approximately 900° C.

14. The process according to claim 11, wherein, in step (a), sulfur is present in an amount providing at least about 0.4% S (calculated as elemental sulfur), based on the combined dry weight of the source of iron oxide and the carbonaceous fuel.

15. The process according to claim 12, wherein, in step (a), sulfur is present in an amount providing at least about 0.4% S (calculated as elemental sulfur), based on the combined dry weight of the source of iron oxide and the carbonaceous fuel.

16. The process according to claim 13, wherein, in step (a), sulfur is present in an amount providing at least about 0.4% S (calculated as elemental sulfur), based on the combined dry weight of the source of iron oxide and the carbonaceous fuel.

17. The process according to claim 14, wherein the sulfuric content in the offgas after precipitating out the ZnS is in the range of about 25 $ppm_v$ to about 50 $ppm_v$.

18. The process according to claim 15, wherein the sulfuric content in the offgas after precipitating out the ZnS is in the range of about 25 $ppm_v$ to about 50 $ppm_v$.

19. The process according to claim 16, wherein the sulfuric content in the offgas after precipitating out the ZnS is in the range of about 25 $ppm_v$ to about 50 $ppm_v$.

* * * * *